US008932127B2

(12) United States Patent
Wright et al.

(10) Patent No.: US 8,932,127 B2

(45) Date of Patent: *Jan. 13, 2015

(54) SECONDARY GAME SYSTEM FOR A GAMING TERMINAL NETWORK

(75) Inventors: Dean Wright, Sydney (AU); Stephen Cowan, Sydney (AU)

(73) Assignee: Paltronics Australasia PTY Limited, Taren Point (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/176,406

(22) Filed: Jul. 5, 2011

(65) Prior Publication Data

US 2011/0294568 A1 Dec. 1, 2011

Related U.S. Application Data

(63) Continuation-in-part of application No. 12/513,956, filed as application No. PCT/AU2007/001659 on Oct. 31, 2007, now Pat. No. 8,137,186.

(30) Foreign Application Priority Data

Nov. 8, 2006 (AU) ................................ 2006906239
Jul. 7, 2010 (AU) ................................ 2010202863

(51) Int. Cl.
*A63F 13/00* (2014.01)

(52) U.S. Cl.
USPC ............................................ 463/20; 463/25

(58) Field of Classification Search
CPC ............................ G07F 17/32; G07F 17/3244
See application file for complete search history.

(56) References Cited

U.S. PATENT DOCUMENTS 7,144,321 B2 12/2006 Mayeroff
7,452,269 B2 11/2008 Gauselmann
(Continued)

FOREIGN PATENT DOCUMENTS

AU 2004222841 A1 11/2004
EP 1418552 A2 5/2004
(Continued)

*Primary Examiner* — Masud Ahmed
(74) *Attorney, Agent, or Firm* — Pearne & Gordon LLP

(57) ABSTRACT

An embodiment of the inventive method commences with the provision of a plurality of secondary games, which may be default secondary games and/or user-initiated secondary games. The latter may have aspects that are dependent upon data entered by the initiating user into their gaming terminal 5. The method proceeds with the provision to the users of information 32 regarding each of the available secondary games (or at least a subset thereof). This assists the users to make informed decisions regarding in which of the secondary games they wish to participate. The method further includes the step of allowing each of the users to register and/or deregister their respective gaming terminal 5 for participation in a selected one of the secondary games.

18 Claims, 6 Drawing Sheets

(56) References Cited

U.S. PATENT DOCUMENTS

| | | | | |
|---|---|---|---|---|
| 2002/0090987 | A1* | 7/2002 | Walker et al. | 463/16 |
| 2004/0009230 | A1 | 1/2004 | Richard et al. | |
| 2004/0092302 | A1* | 5/2004 | Gauselmann | 463/20 |
| 2004/0198487 | A1* | 10/2004 | Schneider | 463/20 |
| 2005/0148383 | A1 | 7/2005 | Mayeroff | |
| 2005/0239542 | A1* | 10/2005 | Olsen | 463/27 |
| 2006/0025192 | A1 | 2/2006 | Walker et al. | |
| 2006/0205459 | A1* | 9/2006 | Rehkemper et al. | 463/1 |
| 2006/0246980 | A1* | 11/2006 | Walker et al. | 463/13 |
| 2006/0252481 | A1* | 11/2006 | Schmit | 463/13 |
| 2007/0087811 | A1 | 4/2007 | Mayeroff | |
| 2008/0026831 | A1 | 1/2008 | Wright et al. | |
| 2008/0113813 | A1 | 5/2008 | Wright et al. | |
| 2008/0153563 | A1 | 6/2008 | Englman | |

FOREIGN PATENT DOCUMENTS

| | | | |
|---|---|---|---|
| WO | 2005107913 | A1 | 11/2005 |
| WO | 2006078670 | A2 | 7/2006 |
| WO | 2006096925 | A1 | 9/2006 |
| WO | 2006104731 | A2 | 10/2006 |

* cited by examiner 28 29 30 31

| Game Title | Number of Participants | Current Jackpot Value | Maximum Jackpot Value |
|---|---|---|---|
| Jackpot 1 | 102 | $1,207.16 | $2,000 |
| Jackpot 2 | 55 | $19,346.02 | $50,000 |
| Jackpot 3 | 12 | $2264.35 | $10,000 |
| Pete's Jackpot | 18 | $390.55 | $500 |
| Footy Team Jackpot | 22 | $794.33 | $1000 |
| Jo's Jackpot | 6 | $46.19 | $1,000 |
| Tim's Jackpot | 89 | $560.27 | $700 |

32

Fig. 6

SECONDARY GAME SYSTEM FOR A GAMING TERMINAL NETWORK

The present invention relates to a secondary game system for a gaming terminal network.

The invention has been developed primarily for use with a plurality of interlinked gaming machines in a gaming establishment and will be described with reference to this application. However, the invention is not limited to that particular field of use and is also suitable for use with online gaming, gaming machines that are distributed over a plurality of gaming establishments, lotto, pools, lotteries, art unions, bingo, raffles and other games involving one or more wagers being placed upon an outcome having a finite probability of occurring.

BACKGROUND

The discussion of the prior art within this specification is to assist the addressee to understand the invention and is not an admission of the extent of the common general knowledge in the field of the invention and is included without prejudice.

It is known to link gaming machines to provide a number of additional functionalities. This includes the ability to control the awarding of a prize, as the pool of available funds is greater and the amount of funds available is known rather than having to be estimated. Another known purpose of interlinking gaming machines is to provide secondary gaming such as a linked jackpot. In such a system, a central display typically provides the players with a visual indication of a presently available jackpot prize which is increased incrementally as the players operate the interlinked gaming machines. It is known by the players that the prize will be awarded when it reaches a secret, randomly selected value that is less than a predetermined limit value. The limit value is often also visually indicated to the players by means of the display.

The use of such functionality is intended to attract players to play the machines in the hope of winning the jackpot. However, with the increased sophistication of players and their increased exposure to such systems, the systems' ability to maintain players' interest has diminished.

It is an object of the present invention to overcome, or at least substantially ameliorate, one or more of the disadvantages of the prior art or at least to provide a useful alternative.

SUMMARY OF THE INVENTION

A first aspect of the invention provides a secondary game system for a gaming terminal network, including:

- at least one secondary game controller for providing a plurality of secondary games and for providing information regarding each of at least a subset of the plurality of secondary games; and
- a communications device for receiving secondary game registration request messages and secondary game deregistration request messages from a gaming terminal, said secondary game registration request messages being sent in response to operation of a user operable registration input device for allowing a user of the gaming terminal to indicate a desire to register in at least one of said plurality of secondary games;
- the system being responsive to a received secondary game registration request message from the gaming terminal by causing said gaming terminal to be registered in at least one of said plurality of secondary games; and
- the system being further responsive to a received secondary game deregistration request message from the gaming terminal by causing said gaming terminal to be deregistered from one of said plurality of secondary games.

Preferably the information is displayed on a display unit operatively connected to the secondary game controller. In an embodiment the display unit is integral to the gaming terminal and in another embodiment it is a standalone display unit.

In an embodiment the information includes at least one of the following for each game in the subset: a secondary game name; a number of gaming terminals presently registered in the secondary game; and/or one or more primary games to which the secondary game is restricted (if any).

In one embodiment at least one of the secondary games is a jackpot game and the information provided by the secondary game controller in relation to the at least one jackpot game includes at least one of the following:

- a presently accrued value of the jackpot;
- a minimum value of the jackpot;
- a maximum value of the jackpot;
- a number of gaming terminals currently contributing to the jackpot;
- a current rate of contribution to the jackpot;
- an average rate of contribution to the jackpot;
- an average previously awarded jackpot prize amount;
- a previously awarded jackpot prize amount;
- identification of at least one gaming terminal at which a previously awarded jackpot prize was awarded; and/or
- an average time between the award of previously awarded jackpot prizes.

Preferably the subset includes all secondary games in which at least one gaming terminal is currently registered. Alternatively the subset may be selected on the basis of historical usage data.

In one embodiment the secondary game controller is adapted to create a new secondary game for inclusion within the plurality of secondary games in response to receipt from a gaming terminal of a game creation message. In this embodiment the game creation message is sent in response to operation of a user operable input device for allowing a user of the gaming terminal to indicate a desire to create a new secondary game.

Preferably at least one aspect of the new secondary game is dependent upon user entered data that is communicated from the gaming terminal to the secondary game controller. For example, a game title of the new secondary game may be dependent upon user entered data that is communicated from the gaming terminal to the secondary game controller. Further, at least one game parameter of the new secondary game may be dependent upon user entered data that is communicated from the gaming terminal to the secondary game controller. For example, in an embodiment in which the new secondary game is a jackpot game, the at least one game parameter may be any one or more of the following:

- a first value at which a jackpot accrual value is commenced;
- a second value by which a jackpot prize must be awarded to at least one user of a gaming terminal; and/or
- a rate at which any gaming terminals that are registered in the jackpot game must contribute to the jackpot accrual value.

In another embodiment the new secondary game may be selected from amongst a plurality of predetermined game templates each having predetermined game parameters.

Preferably the information is provided to a player in response to operation of a user operable input device for allowing a user of the gaming terminal to indicate a desire to review the information.

Another aspect of the invention provides a secondary gaming method including the steps of:

- providing a plurality of secondary games;
- allowing a user of an initiating gaming terminal to request the creation of a new secondary game for inclusion within the plurality of secondary games;
- providing information regarding each of at least a subset of the plurality of secondary games; and
- allowing other users of other gaming terminals to register and/or deregister their respective gaming terminals for participation in a selected one of the secondary games.

In an embodiment an aspect of the new secondary game may be dependent upon data entered by the user into the initiating gaming terminal. Preferably the data entered by the user is validated prior to creating the new secondary game.

BRIEF DESCRIPTION OF THE DRAWINGS

Preferred embodiments of the invention will now be described, by way of example only, with reference to the accompanying drawings, in which:

FIG. 6 is a schematic depiction of a display screen provided by yet another embodiment of the invention.

DETAILED DESCRIPTION

Figure 1:
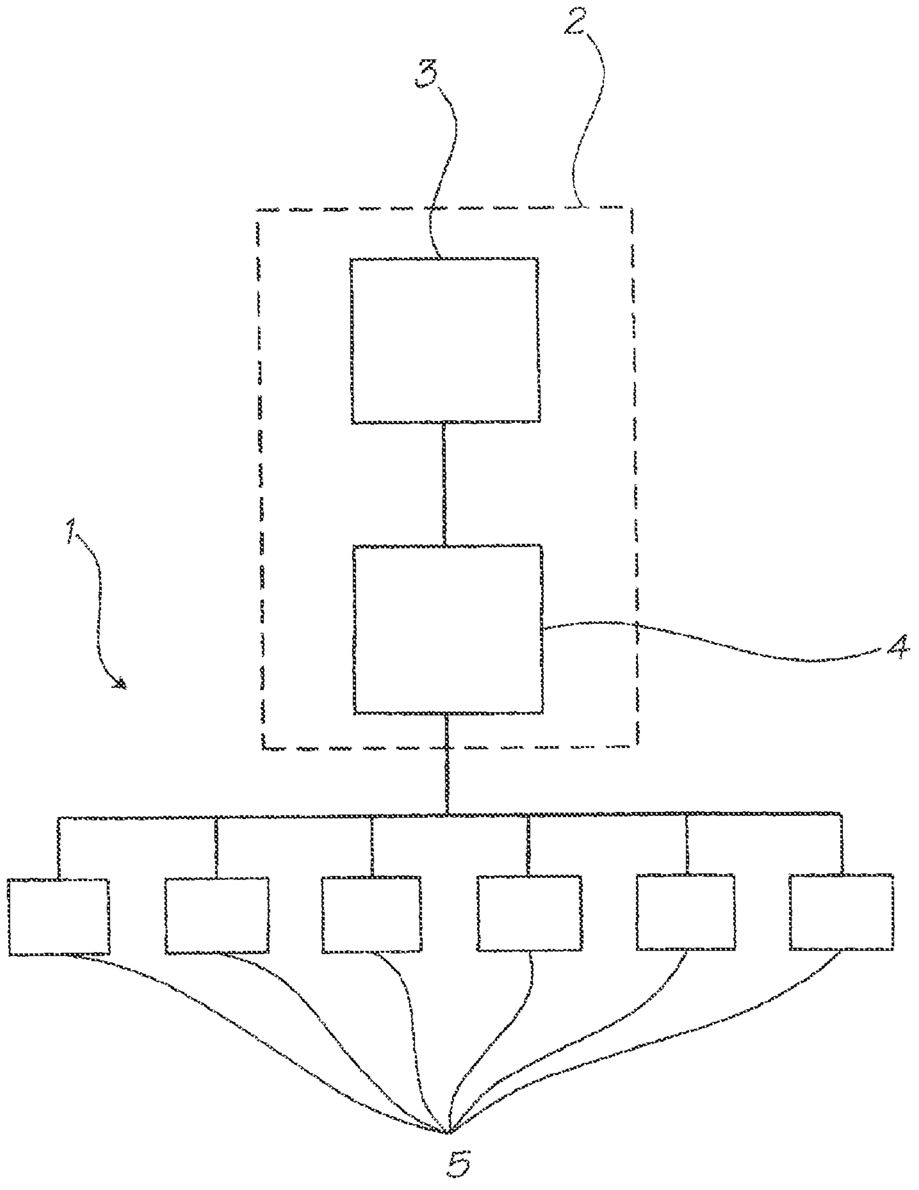
FIG. 1 is a schematic block diagram of a gaming system including a secondary game system.

In overview, FIG. 1 is a schematic block diagram of a gaming system 1 including a secondary game system 2 for a gaming terminal network. The secondary game system includes at least one secondary game controller 3 for providing at least one secondary game, and a communications device 4 for receiving secondary game registration request messages and secondary game deregistration request messages from a gaming terminal 5. The secondary game system 2 is responsive to a received secondary game registration request message from a gaming terminal 5 by causing said gaming terminal to be registered in one of said at least one secondary game. The secondary game system 2 is further responsive to a received secondary game deregistration request message from a gaming terminal 5 by causing said gaming terminal to be deregistered from one of said at least one secondary game.

Figure 2:
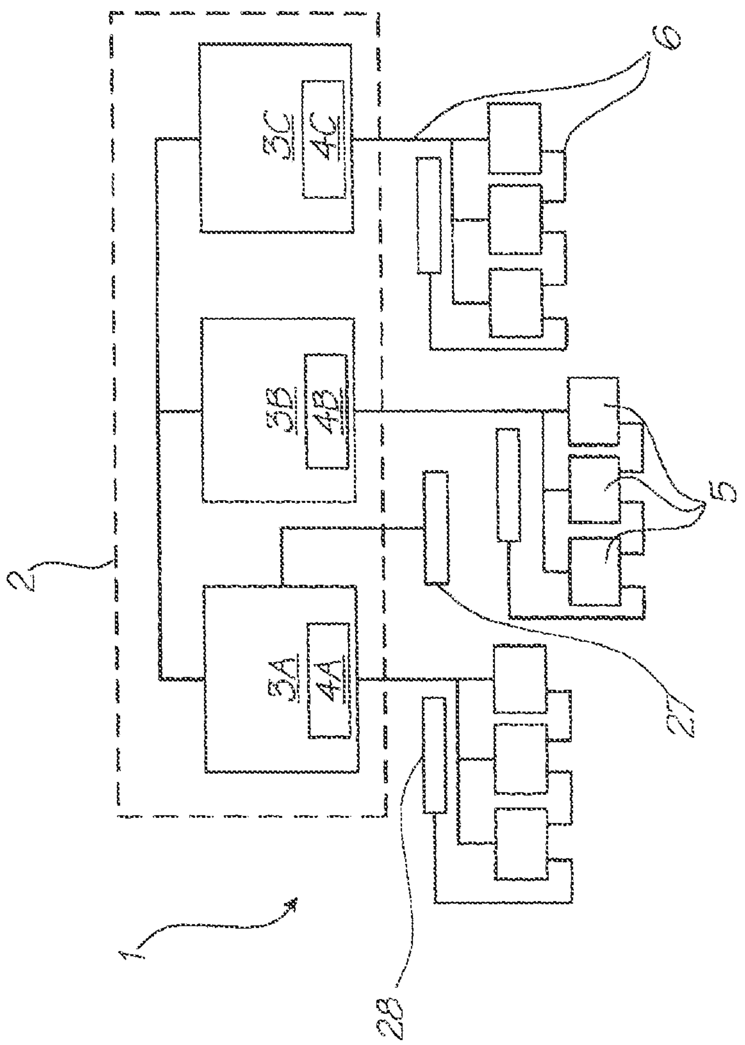
FIG. 2 is a schematic block diagram of a preferred embodiment of a gaming system.

FIG. 2 shows a preferred structure of a gaming system 1. This gaming system includes a secondary game system 2, which in turn includes three secondary game controllers or jackpot controllers 3A, 3B, 3C for providing respective secondary games in the form of jackpot games. In this specification, "jackpot game" is intended to mean a single- or multi-level jackpot game in which a player participates by playing a primary game on a gaming terminal, a proportion of the wager made on, or the turnover of, or the funds added to, the gaming terminal being used as a contribution in the jackpot game. Each of the secondary game controllers provides a particular respective secondary game or jackpot game, and each includes a respective communications device 4A, 4B, 4C for communicating with a respective cluster of gaming terminals 5 via a serial, non-addressable, multi-drop communications link, such as an RS-485 link 6. In one embodiment, by default, each of the gaming terminals 5 connected to a particular secondary game controller 3A, 3B, 3C is registered in the secondary game provided by that controller (the "local" secondary game). In another embodiment, the gaming system is initialised such that each of the gaming terminals is registered in a secondary game selected by venue management.

Figure 3:
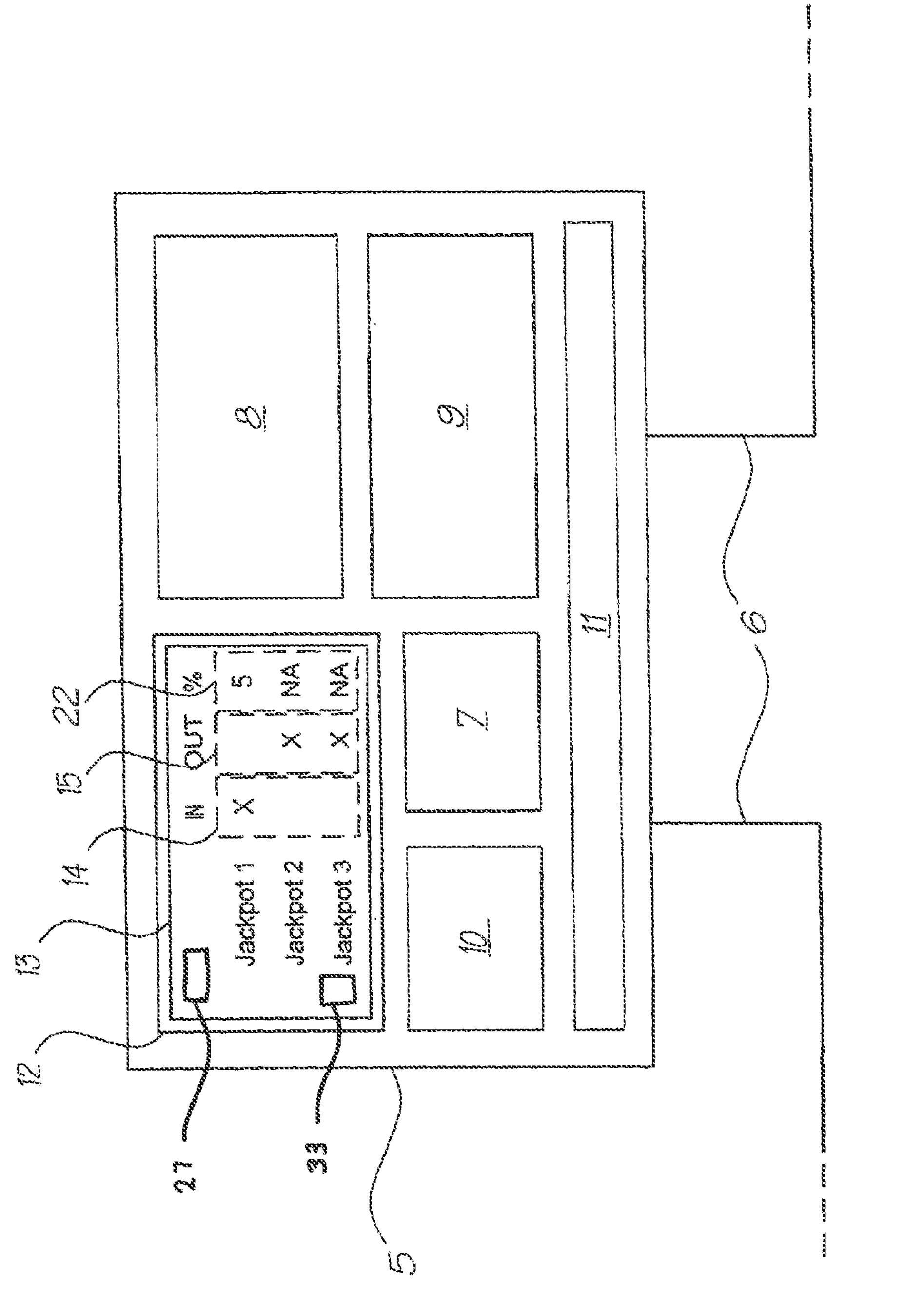
FIG. 3 is a more detailed schematic block diagram of a gaming terminal of the gaming system shown in FIG. 2.

With reference to FIG. 3, each gaming terminal 5 includes a processor 7 for providing a primary game. A display screen 8 provides a user with information regarding the primary game, and a control panel 9 allows the user to make selections and input information relating to the primary game. Memory 10 is also provided. A communications card 11 allows communication with the secondary game system 2. A secondary game control panel 12 is also provided having a touch screen 13 for displaying information regarding available secondary games and for allowing the user of the gaming terminal to make selections. A first region 14 of the touch screen 13 serves as a user-operable registration input device, in that the user of the gaming terminal may operate that region 14 to indicate a desire to register in a secondary game. Similarly, a second region 15 of the touch screen 13 serves as a user-operable deregistration input device, in that the user may operate that region 15 to indicate a desire to deregister from a secondary game.

The gaming terminal is responsive to operation of the first region 14 of the touch screen by sending a secondary game registration request message to the secondary game system 2. The secondary game registration request message includes information identifying: the gaming terminal sending the message; and the secondary game to which registration is desired. Similarly, the gaming terminal is responsive to operation of the second region 15 of the touch screen by sending a secondary game deregistration request message to the secondary game system 2. The secondary game deregistration request message includes information identifying: the gaming terminal sending the message; and the secondary game from which deregistration is desired.

In one embodiment, a gaming terminal may only be registered in one secondary game at any time. In this embodiment, when the first region 14 of the touch screen 13 is operated, the gaming terminal 5 sends both a secondary game registration request message to effect registration in the newly selected secondary game, and a secondary game deregistration request message to effect deregistration from the previous secondary game. In an alternative such embodiment, a single message is sent which effects both transactions. In other embodiments, registration in zero or multiple secondary games is permitted; in such embodiments, it is not necessary to effect both types of transaction at each operation of the first and second regions 14, 15 of the touch screen 13.

In one embodiment, the gaming terminal sends secondary game contribution messages in a known way to the secondary game controller 3A, 3B, 3C. In other embodiments, for example in which registration in more than one secondary game is permitted, more sophisticated secondary game contribution messages are required which include both information to identify the value of the contribution, and addressing information of the controller 3A, 3B, 3C providing the secondary game to which the contribution is to be made.

Figure 4:
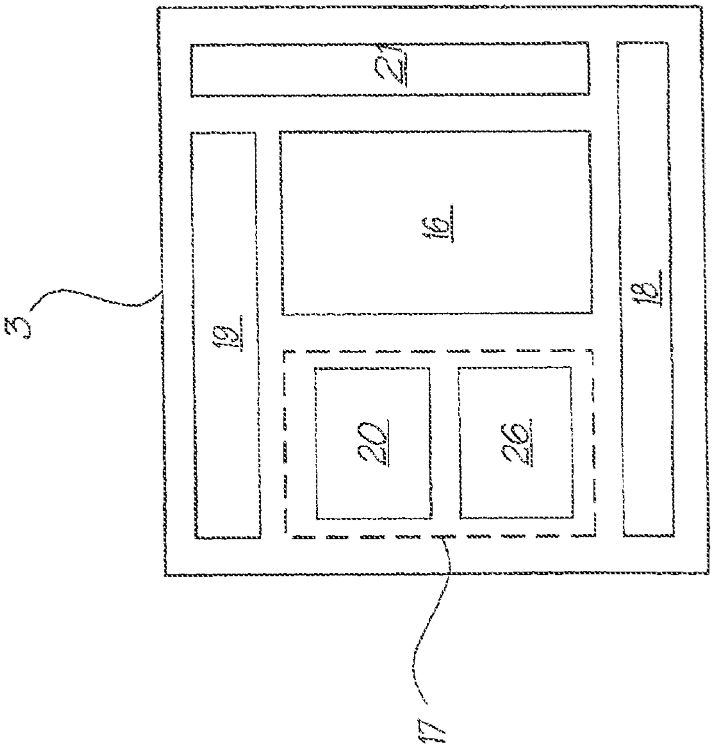
FIG. 4 is a more detailed schematic block diagram of a secondary game controller of the gaming system shown in FIG. 2.

FIG. 4 is a block diagram of a secondary game controller 3 forming part of the secondary game system 2. The secondary game controller 3 includes a processor 16, for providing a secondary game, and associated memory 17. The controller 3 also includes a communications device 18, in the form of an RS-485 card, for communications with gaming terminals 5. A second communications device 19, in the form of an interface card for an addressable communications network such as an Ethernet, provides for communication between secondary game controllers 3 in the secondary game system 2. In the memory 17, the controller 3 stores information 20 regarding the associated gaming terminals 5. That is to say, for each gaming terminal 5 connected to the controller via the RS-485 link, the memory includes information regarding the secondary game or games in which each associated gaming terminal is registered. The secondary game controller also includes a video card 21 for controlling a display screen 22 for displaying to users of gaming terminals 5 information regarding the secondary game being provided by the secondary game controller. Upon receipt of a secondary game registration request message from a gaming terminal 5, a secondary game controller 3A extracts from the message the information identifying the gaming terminal and the desired secondary game. If the desired secondary game is the local secondary game, the secondary game controller 3A updates the stored information to indicate that the gaming terminal is registered in that secondary game. If the desired secondary game is a secondary game provided by another secondary game controller 3B, 3C (a "remote" secondary game), the secondary game controller receiving the message updates the stored information to indicate the controller 3B, 3C to which secondary game contribution messages from that gaming terminal 5 are to be passed. The secondary game controller 3A also sends a secondary game registration control message to the secondary game controller 3B, 3C providing the desired secondary game. That secondary game controller 3B, 3C updates information stored in its memory to indicate that a remote gaming terminal is registered.

In an analogous way, upon receipt of a secondary game deregistration message from a gaming terminal 5, the secondary game controller 3A extracts from the message the information identifying the gaming terminal and the secondary game from which deregistration is desired. Locally stored information about the gaming terminal 5 is updated and a message sent to a further secondary game controller 3B, 3C, if the identified secondary game is remote.

As indicated above, the gaming terminals 5 send secondary game contribution messages. The secondary game controllers 3A, 3B, 3C extract from these messages information identifying the gaming terminal 5 from which they were sent. By accessing the locally stored information 20, a controller 3A receiving such a message is able to determine whether the contribution is to be applied to the local secondary game, or if the message must be forwarded to another of the secondary game controllers 3B, 3C.

In a preferred embodiment, the gaming terminals 5 include respective user-operable secondary game contribution input devices, in the form of a third region 22 of the touch screen 13, for allowing a user of the gaming terminal to specify a desired contribution to a secondary game. A similar system is discussed in our copending PCT patent application published with the number WO 2005/107913 A1, the full contents of which are herein incorporated by reference. In this way, the user may reduce or increase the amount of his contribution to a secondary game, and thereby reduce or increase the likelihood of winning the secondary game, while simultaneously increasing or reducing his wager on the primary game.

Figure 5:
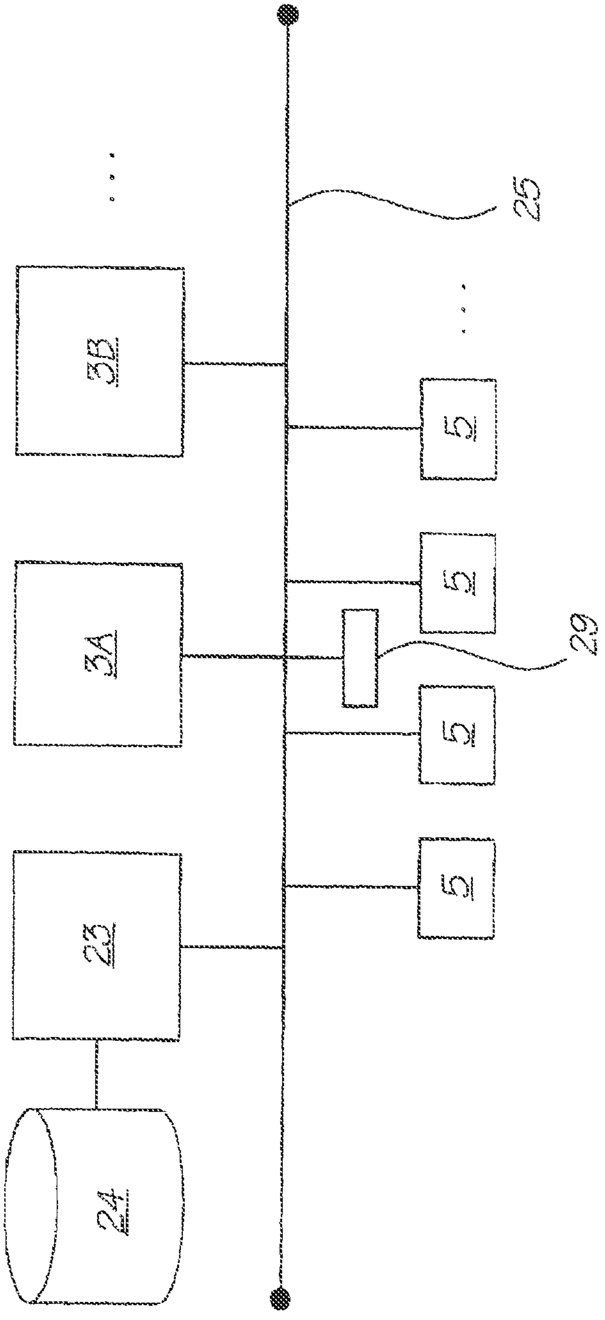
FIG. 5 is a schematic block diagram of another embodiment of a gaming system.

In the foregoing example, data indicating which gaming terminal 5 is registered in which of the secondary games is stored and processed by the secondary game controllers 3A, 3B, 3C themselves. In a further embodiment, shown schematically in FIG. 5, a secondary game coordinator 23 is provided in communication with the secondary game controllers. In this embodiment, the secondary game coordinator 23 maintains a database 24 including for each of a plurality of gaming terminals data indicative of respective secondary games in which the gaming terminal is registered. The gaming terminals, the secondary game controllers and the secondary game coordinator communicate via an Ethernet link 25, and the secondary game coordinator ensures that secondary game contribution messages are routed to the appropriate secondary game controller 3A, 3B, 3C.

In the previously described embodiment of a gaming system, shown in FIG. 2, the routing of messages from the gaming terminals to the appropriate secondary game controller is managed by the secondary game controllers. In the present embodiment, shown in FIG. 5, using an Ethernet or another addressable networking system, the gaming terminals themselves, or the respective communication cards 11 in the gaming terminals, may include addressing information in the various messages that they send. Alternatively, all messages sent by the gaming terminals may be received by the secondary game coordinator, which responds by issuing appropriately addressed messages to the appropriate secondary game controllers.

In a preferred embodiment, at least one of the secondary games (a "restricted" secondary game) is only available to users of gaming terminals 5 that are providing a specified primary game. In such an embodiment, the secondary game system stores resource data 26, for example in the memory of the secondary game controllers 3A, 3B, 3C. This resource data includes executable files and audiovisual data for allowing the gaming terminals to provide a particular primary game. In the event that a user indicates a desire to participate in a restricted secondary game, and his gaming terminal is not already providing the necessary primary game, the gaming terminal downloads the resource data 26 from the secondary game system 2. This functionality is discussed in further detail in our copending PCT patent application published with the number WO 2006/096925 A1, the full contents of which are herein incorporated by reference. In any of the previously described embodiments, screens may display information regarding the available secondary games, to enable users of the gaming terminals to make informed decisions as to which secondary game they wish to participate in. This information may include any or all of: the name of the secondary game, the presently accrued value of a jackpot, the maximum and minimum values of the jackpot, the number of gaming terminals presently registered in the secondary game, the primary games to which the secondary game is restricted (if any), and so on.

In some embodiments, screens 27 (in FIG. 2) are controlled by the secondary game controllers via a video card 21 (shown in FIG. 4). Additionally or alternatively, the information may be shown on screens 28 (in FIG. 2) connected to the secondary controllers via the same communications path as the gaming terminals. Additionally or alternatively, the display screen 8 or the touch screen 13 of the gaming terminals may display this information. Finally, the secondary game coordinator 23 may drive one or more displays for providing this information to users of the gaming terminals, or dedicated display units 29 may be connected to the Ethernet network (shown in FIG. 5). Thus, any or all of the above information may be communicated around the gaming network and stored in memory in various locations, including: memory 10 of the gaming terminals 5, memory in the communications card 11 of the gaming terminals, memory 17 of the secondary game controllers 3, and memory in—or the database 24 maintained by—the secondary game coordinator 23.

In some embodiments of the invention, the gaming terminals are provided in a singe venue. In alternative embodiments, the gaming terminals are distributed among a number of such establishments or other locations and/or the terminals include other devices such as personal computers. In some such latter cases, communication between the terminals and the secondary game system may be effected for example by means of an existing network, such as the internet, or by telephone dial-up or radio communication or by a combination of the above.

In another embodiment of the invention the secondary game controller 3 is programmed to provide users with information 32 to assist them to make an informed choice of the secondary game in which they wish to participate. The user accesses this information 32 by operation of a user operable input device for allowing a user of the gaming terminal 5 to indicate a desire to review the information, for example by pressing region 27 on the touch screen 13, as shown in FIG. 3. This causes the touch screen 13 to display information 32 to the user relating to each of the available secondary games, such as that shown for example in FIG. 6. This information 32 includes the names of the available secondary games (referred to as "game titles" 28 in FIG. 6). In the example shown in FIG. 6, the first three secondary games, having titles "Jackpot 1", "Jackpot 2" and "Jackpot 3" are default games that are always provided by this embodiment of the secondary controller 3. However, the remaining secondary games, the titles of which are shown for example in FIG. 6, are secondary games that some users have initiated by a process that shall be described later in this detailed description.

As shown in FIG. 6, the information 32 also includes the current number of participants 29, which is equal to the number of active gaming terminals 5 that are currently registered for each of the secondary games.

In the embodiment to which FIG. 6 relates, each of the secondary games are mystery value jackpot-type games. For this type of game a jackpot value commences at a minimum value and accrues based on the contributions from the registered gaming terminals 5 until a mystery value has been reached. At this point the jackpot value is awarded as a prize to the user of the registered gaming terminal 5 that contributed the amount which caused the jackpot value to exceed the mystery value. It is known by the players that the mystery value is typically some value that is less than a maximum jackpot value. For such secondary games, the information 32 may include prize-related information such as the presently accrued value of the jackpot 30 for each of the secondary games. The information 32 may also include the maximum values 31 by which the jackpot prizes must be awarded. Hence, a user may review the information 32 and may decide to register their gaming terminal 5 to participate in a jackpot game for which the presently accrued jackpot value 30 is closest to the maximum value 31. Alternatively, a user may review the list of available game titles 28 and may choose to participate in a particular secondary game, for example because it may have been created by a friend or acquaintance.

For embodiments of the invention in which a large number of secondary games are made available to users, the secondary game controller 3 may be programmed to only make the information 32 available to the users in relation to a subset of the plurality of secondary games. For example, the subset of secondary games for which the information 32 is provided may encompass only those secondary games in which at least one gaming terminal 5 is currently registered. Alternatively the subset may be selected on the basis of historical usage data. For example, the information 32 may be shown only in relation to the subset of secondary games that have been in the top 5 most popular secondary games over a window of time, such as a week, for example.

The information 32 is displayed on a display unit that is operatively connected to the secondary game controller 3. In the illustrated embodiment this takes the form of touch screen 13, or display screen 8, each of which are integral to the gaming terminal 5. For one such embodiment the secondary game controller 3 continuously outputs a visual signal that defines the information 32 and which is displayed on the touch screen 13 or display screen 8. In another such embodiment the secondary game controller 3 communicates data that defines the information 32, which is stored in the memory 10 of the relevant gaming terminals 5. This data is then used by the gaming terminal processor 7 as the basis to form the display on touch screen 13 or display screen 8. Each time the information 32 regarding any of the available secondary games changes, the secondary game controller 3 communicates new data, which overwrites the previous data stored in the gaming terminal's memory 10 and then forms the basis of a new display to the user of the gaming terminal 5. In yet other embodiments the information 32 is displayed on one or more standalone display units, which are typically mounted in elevated positions adjacent to the gaming terminals 5 so as to be visible to the users of the gaming terminals 5. Yet other embodiments may utilise both displays integral to the gaming terminals 5 and standalone displays.

In alternative embodiments (not illustrated) additional information may be provided to the users by the secondary game controller 3 in relation to each of the jackpot games, such as:

- the number of gaming terminals 5 that are currently contributing to the accrued jackpot value;
- the minimum jackpot value;
- the current rate of contribution to the jackpot accrual value;
- the average rate of contribution to the jackpot accrual value;
- the average previously awarded jackpot prize amount;
- the last jackpot prize amount that was awarded;
- identification of the gaming terminal(s) 5 at which a previously awarded jackpot prizes were awarded; and/or
- the average time between the award of previously awarded jackpot prizes.

In order to provide this type of information, the secondary game controller 3 is programmed to compile the relevant statistics and store them in its memory 17.

As mentioned above, the secondary game controller 3 is adapted to create new user-initiated secondary games. The process for a user to initiate a new secondary game commences with the initiating user operating a user operable input device, for example by touching a region 33 of their touch screen 13, to indicate their desire to create a new secondary game. In response to touching of this region 33 the initiating user's gaming terminal 5 sends via its communications card 11 a game creation message to the communications device 4 of the secondary game controller 3. Upon receipt of this game creation message, the secondary game controller 3 sends a message to the initiating gaming terminal 5 that causes some input screens to be displayed on the touch screen 13 of the initiating gaming terminal 5. The first of these input screens includes a keyboard to allow the initiating user to enter a title for the new game, for example "Pete's Jackpot". Once entered, the game title is communicated from the initiating gaming terminal 5 to the secondary game controller 3. The next input screen allows the initiating user to enter some game parameters for the new secondary game, which allows the initiating user to define:

a first value at which the jackpot accrual value is to commence;

a second value by which the jackpot prize must be awarded; and a rate at which any gaming terminals that are registered in the jackpot game must contribute to the jackpot accrual value, which is typically expressed as a percentage.

This data is then communicated from the initiating gaming terminal 5 to the secondary game controller 3 and once it has been received, the secondary game controller 3 has the information necessary to create the new secondary game. In one embodiment the secondary game controller 3 is programmed to automatically validate the data that was entered by the user. This includes comparing the words used in the name of the proposed new secondary game to a list of banned words. The name of the proposed new game is only validated if it does not include any of the banned words. This allows the system to automatically ensure that no banned words, such as sware words or the like, are displayed to the users. The secondary game controller 3 also automatically validates the user-entered parameters to ensure that each parameter lies within a respective predefined allowable range. Another embodiment utilises a manual validation process whereby an authorised person determines whether the user-entered data is acceptable and enters the result of this determination into the secondary game controller 3.

In the event that the user-entered data fails the validation process, the secondary game controller 3 causes a message to be displayed to the initiating user's gaming terminal 5 requesting re-entry of the item or items of data that caused the validation failure.

In yet another embodiment, the input screens at which the user enters the game parameters are tailored so as to only allow for the input of parameter values that lie within the relevant predefined allowable range.

Once the user-entered data has passed the validation process, the secondary game controller 3 uses a random number generator (or pseudo-random number generator) to randomly generate a mystery value for the new secondary game, which lies between the first and second values. It will be appreciated that this mystery value is not communicated to any of the players. Once created, the new secondary game is included within the plurality of secondary games and is therefore available to be participated in by any users who so choose. In some embodiments, the initiating user's gaming terminal 5 is automatically registered to participate in the newly created secondary game.

In another embodiment the initiating user does not have to define the game parameters when initiating a new secondary game. Rather, after entering a title for the new secondary game, the secondary game controller causes the touch screen 13 on the initiating gaming terminal 5 to display a plurality of predetermined game templates each having predetermined game parameters, from which the initiating user may choose. The initiating user simply touches the chosen game template and the relevant game parameters are then communicated from the initiating gaming machine 5 to the secondary game controller 3, which then creates the new secondary game.

Hence, in summary, this embodiment of the invention performs a method having the following steps:

providing a plurality of secondary games, which may be default secondary games and/or user-initiated secondary games which may have aspects that are dependent upon data entered by the initiating user into their gaming terminal 5;

providing information 32 regarding each of the secondary games (or at least a subset thereof) to assist users to make an informed decision regarding in which of the secondary games they wish to participate; and allowing each of the users to register and/or deregister their respective gaming terminal 5 for participation in a selected one of the secondary games.

Although the invention has been described with reference to specific examples, it will be appreciated by those skilled in the art that it may be embodied in many other forms. In particular features of any one of the various described examples may be provided in any combination in any of the other described examples.

What is claimed is:

1. A secondary game system for a gaming terminal network, including:

at least one secondary game controller configured to provide a plurality of user-selectable secondary games and configured to provide information regarding each of at least a subset of the plurality of secondary games, wherein the information is provided to a user of a claming terminal so as to assist the user to decide in which of the user-selectable secondary games they wish to register and wherein the information includes a number of gaming terminals presently registered in the secondary game; and a communications device configured to receive secondary game registration request messages and secondary game deregistration request messages from the gaming terminal, said secondary game registration request messages being sent in response to operation of a user operable registration input device for allowing the user of the gaming terminal to specifically indicate a desire to register in at least one of said plurality of secondary games;

the system being responsive to a received secondary game registration request message from the gaming terminal by causing said gaming terminal to be registered in at least one of said plurality of secondary games; and the system being further responsive to a received secondary game deregistration request message from the gaming terminal by causing said gaming terminal to be deregistered from one of said plurality of secondary games.

2. A secondary game system according to claim 1 wherein said information is displayed on a display unit operatively connected to the secondary game controller.

3. A secondary game system according to claim 2, wherein the display unit is integral to the gaming terminal.

4. A secondary game system according to claim 2, wherein the display is a standalone display unit.

5. A secondary game system according to claim 1 wherein the information includes at least one of the following for each game in the subset:

a secondary game name; or one or more primary games to which the secondary game is restricted (if any).

6. A secondary game system according to claim 1 wherein at least one of the secondary games is a jackpot game and wherein the information provided by the secondary game controller in relation to the at least one jackpot game includes at least one of the following:

a presently accrued value of the jackpot;

a minimum value of the jackpot; and/or a maximum value of the jackpot.

7. A secondary game system according to claim 1 wherein at least one of the secondary games is a jackpot game and wherein the information provided by the secondary game controller in relation to the at least one jackpot game includes at least one of the following:

a number of gaming terminals currently contributing to the jackpot;

a current rate of contribution to the jackpot;

an average rate of contribution to the jackpot;

an average previously awarded jackpot prize amount;

a previously awarded jackpot prize amount;

identification of at least one gaming terminal at which a previously awarded jackpot prize was awarded; and/or an average time between the award of previously awarded jackpot prizes.

8. A secondary game system according to claim 1 wherein the subset includes all secondary games in which at least one gaming terminal is currently registered.

9. A secondary game system according to claim 1 wherein the subset is selected on the basis of historical usage data.

10. A secondary game system according to claim 1 wherein the secondary game controller is adapted to create a new secondary game for inclusion within the plurality of secondary games in response to receipt from a gaming terminal of a game creation message.

11. A secondary game system according to claim 10 wherein the game creation message is sent in response to operation of a user operable input device for allowing a user of the gaming terminal to indicate a desire to create a new secondary game.

12. A secondary game system according to claim 10 wherein at least one aspect of the new secondary game is dependent upon user entered data that is communicated from the gaming terminal to the secondary game controller.

13. A secondary game system according to claim 12 wherein a game title of the new secondary game is dependent upon user entered data that is communicated from the gaming terminal to the secondary game controller.

14. A secondary game system according to claim 12 wherein at least one game parameter of the new secondary game is dependent upon user entered data that is communicated from the gaming terminal to the secondary game controller.

15. A secondary game system according to claim 14 wherein the new secondary game is a jackpot game and wherein the at least one game parameter is any one or more of the following:

a first value at which a jackpot accrual value is commenced;

a second value by which a jackpot prize must be awarded to at least one user of a gaming terminal; and/or a rate at which any gaming terminals that are registered in the jackpot game must contribute to the jackpot accrual value.

16. A secondary game system according to claim 10 wherein the new secondary game is selected from amongst a plurality of predetermined game templates each having predetermined game parameters.

17. A secondary game system according to claim 1 wherein said information is provided to a player in response to operation of a user operable input device for allowing a user of the gaming terminal to indicate a desire to review the information.

18. A jackpot game system for a gaming terminal network, including:

at least one jackpot game controller configured to provide a plurality of user-selectable jackpot games and configured to provide information regarding each of at least a subset of the plurality of jackpot games, wherein the information is provided to a user of a gaming terminal so as to assist the user to decide in which of the user-selectable jackpot games they wish to register and wherein the information includes a number of gaming terminals currently contributing to the jackpot; and a communications device configured to receive jackpot game registration request messages and jackpot game deregistration request messages from the gaming terminal, said jackpot game registration request messages being sent in response to operation of a user operable registration input device for allowing the user of the gaming terminal to specifically indicate a desire to register in at least one of said plurality of jackpot games;

the system being responsive to a received jackpot game registration request message from the gaming terminal by causing said gaming terminal to be registered in at least one of said plurality of jackpot games; and the system being further responsive to a received jackpot game deregistration request message from the gaming terminal by causing said gaming terminal to be deregistered from one of said plurality of jackpot games.

* * * * *

UNITED STATES PATENT AND TRADEMARK OFFICE

CERTIFICATE OF CORRECTION

PATENT NO. : 8,932,127 B2
APPLICATION NO. : 13/176406
DATED : January 13, 2015
INVENTOR(S) : Dean Wright et al.

It is certified that error appears in the above-identified patent and that said Letters Patent is hereby corrected as shown below:

In the Claims,

In column 10, lines 20-21, being lines 7-8 of claim 1, please delete "claming" and insert therefor -- gaming --.

Signed and Sealed this
Twelfth Day of May, 2015

Michelle K. Lee
*Director of the United States Patent and Trademark Office*